Alfred J. Klose, INVENTOR.

ALFRED J. KLOSE,
INVENTOR.

BY
Barkeler & Scantlebury
ATTORNEYS.

United States Patent Office 2,786,356
Patented Mar. 26, 1957

2,786,356

CAGING MECHANISM FOR GYROSCOPES

Alfred J. Klose, Rolling Hills, Calif., assignor to G. M. Giannini & Co. Inc., Pasadena, Calif., a corporation of New York Application May 24, 1954, Serial No. 431,810

11 Claims. (Cl. 74—5.1)

This invention is concerned generally with mechanism for caging a gyroscope.

Caging systems in accordance with the invention may be used for caging gyroscopes of many different types. Some aspects of the invention pertain only to gyroscopes in which the rotor axis has two rotational degrees of freedom with respect to which it is to be caged; while other aspects of the invention pertain also to gyroscopes in which the rotor axis has only one degree of rotational freedom, or is to be caged only with respect to one degree of freedom.

The invention provides means for orienting the rotor axis about one or both gimbal axes to a definitely predetermined caging position, and for releasably locking, or caging, the rotor axis in that position. A particular advantage of mechanism in accordance with the invention is that it may conveniently be controlled from a position remote from the gyroscope itself.

A further advantage of the invention is that the caging mechanism may be entirely self-sufficient, and is not dependent for effective operation upon the action of a gyroscope erecting system, for example, nor upon any particular orientation of the gyroscope case.

Furthermore, the invention is capable of correctly orienting the gyroscope gimbals from any initial position within the full 360° of their movement.

A further advantage of the invention is that the gimbal or gimbals are required to carry remarkably little mechanism. Substantially the whole of the remaining mechanism may be mounted outside of the gimbals, and even outside of the fixed housing.

In preferred form of the invention the only moving part of the caging mechanism that needs to be located within the fixed housing is a single member. That member will be referred to for convenience as a spindle, but without thereby implying any limitation upon its form. That spindle is rotatable about its axis to drive the gimbals successively or simultaneously to caging positions, and is movable axially in one direction to lock the gimbals in caging positions and in the other direction to release the gimbals. Since no other types of movement are required of the spindle, the amount of space that must be provided for it within the housing may be very small. Moreover, the relatively simple movements required of the spindle greatly facilitate the sealing of the aperture through which it enters the case, should such sealing be required.

A further important aspect of the invention has to do with particularly economical and effective mechanism for driving the caging spindle in the required types of movement. In preferred form of such driving mechanism, both the rotary and the axial movements required for the caging operation are driven by a single motor, and the opposite axial movement required for the uncaging operation is driven by reverse operation of the same motor. That may be accomplished, for example, in accordance with the invention, by driving the spindle from a driving shaft through a pair of helical gears, or equivalent mechanism, by which rotation of the driving shaft exerts a combined torque and axial thrust upon the spindle.

A further aspect of the invention concerns means for driving the inner gimbal to a predetermined caging position by means of a driving connection that extends through the outer gimbal along the axis of the outer gimbal. In preferred form of that aspect of the invention, the driving connection to the inner gimbal is so arranged as to simultaneously exert a positioning torque upon the outer gimbal.

A full understanding of the invention and of its further objects and advantages will be had from the following description of certain embodiments, of which description the accompanying drawings form a part. Those embodiments are only illustrative of the invention, and are not intended as a limitation upon its scope.

Figure 1:
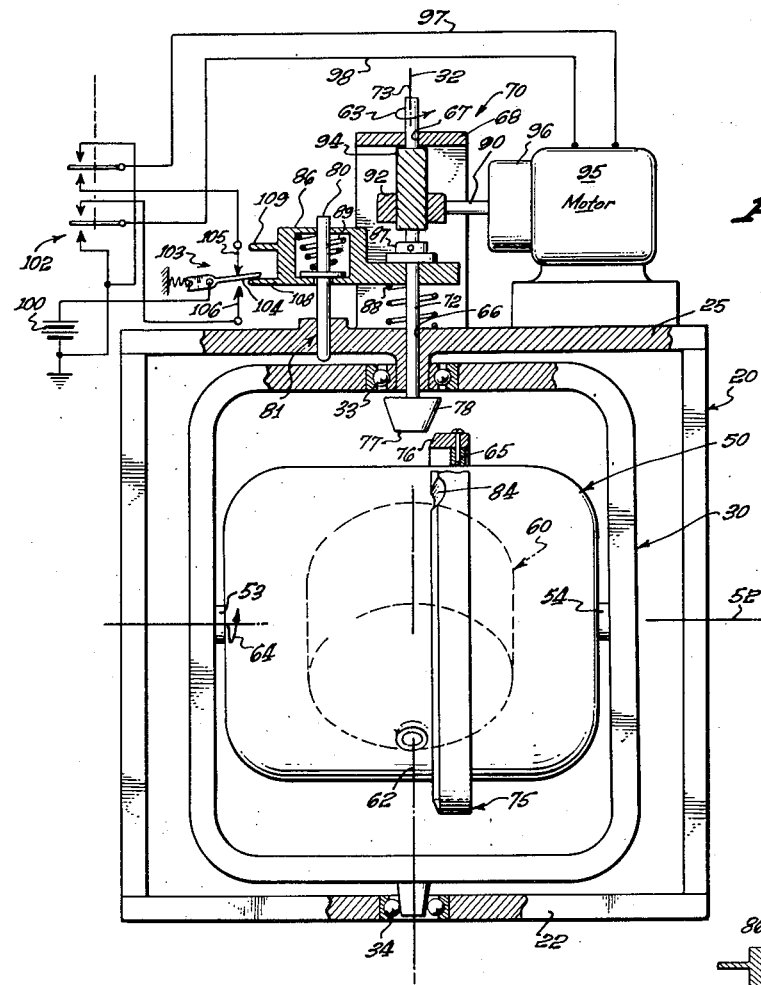
Fig. 1 is a partly schematic side elevation, partly cut away, representing an illustrative embodiment of the invention in uncaged position.

Fig. 1 represents in somewhat schematic form an illustrative embodiment of the invention in a gyroscope which is representative of one type with which the present invention may be used. That gyroscope is shown in an orientation such as would be appropriate, for example, for an aircraft gyroscope for indicating roll and yaw, the direction to the left in Fig. 1 then being forward in the aircraft. For the sake of clarity, the invention will be described with reference to that particular orientation, but without implying any limitation as to orientation in the operation of the described embodiment, or in modifications of that embodiment. On the contrary, it is emphasized that an important advantage of the invention is its ability to operate in any orientation and even under conditions of changing orientation.

A fixed housing is indicated generally at 20, comprising a rectangular case with bottom plate 22 and top plate 25. The outer gimbal of the gyroscope, indicated generally by the numeral 30 is journaled on a vertical outer gimbal axis 32 on upper and lower bearings 33 and 34, mounted in top and bottom plates 25 and 22, respectively, of housing 20. Outer gimbal 30 may be of substantially any conventional type, and is shown illustratively and somewhat schematically as a generally rectangular frame, rotatable about outer gimbal axis 32 throughout 360°.

The inner gimbal, indicated generally at 50, comprises a substantial closed housing, which carries two oppositely positioned pivot studs 53 and 54. Those pivot studs, which define an inner gimbal axis 52, are received, respectively, in journal bearings in the outer gimbal frame. The latter bearings define the position of inner gimbal axis 52 with respect to outer gimbal 30, inner and outer gimbal axes 52 and 32 intersecting perpendicularly and establishing a gimbal axis plane, which is the plane of Fig. 1. Inner gimbal 50 is rotatable throughout 360° about axis 52.

The gyroscope rotor, indicated schematically at 60 in Fig. 1, is journaled with respect to inner gimbal 50 on a rotor axis 62, which, in caged position of the gyroscope, is normal to the gimbal axis plane (normal to the paper in Fig. 1) at the intersection of the two gimbal axes. The rotor may be driven in any suitable manner, not specifically shown, for example by electric power brought in through slip rings of conventional type which accommodate gimbal rotation. Indicating or control means may be provided, responsive to gimbal rotation about one or both of the described gimbal axes. Such indicating or control means may be of many different types, depending upon the service for which the gyroscope is intended, but are not in themselves a part of the present invention and have been omitted in the drawings for clarity of illustration. Each gimbal, together with all its carried structure, is preferably accurately balanced with respect to its gimbal axis, balancing means for that purpose being omitted in the present drawings for clarity of illustration.

The illustrative embodiment of caging means in accordance with the invention, indicated generally at 70 in Fig. 1, comprises a caging spindle 72 journaled on frame 20 for rotary and axial movements with respect to a spindle axis 73, which coincides with outer gimbal axis 32; cooperating driving and locking formations on the caging spindle and on the inner gimbal, the latter means also serving, as will be explained, to drive the outer gimbal; locking means for the outer gimbal; and control means for driving the rotary and axial movements of the spindle. Caging spindle 72 is slidingly journaled in a lower bearing 66 in frame plate 25 concentric within bearing 33, and in an upper bearing 67 in a bracket 68 fixedly mounted on frame plate 25. The lower end of spindle 72 thus extends not only into the interior of housing 20, but also into the space inside outer gimbal 30. The spindle thus has access to structure that may be mounted on the inner gimbal, that access being independent of the position of the outer gimbal.

Inner gimbal 50 carries a special caging member 75, which is shown as a ring rigidly mounted, as by the studs 65, in spaced relation to the gimbal periphery and coaxial with inner gimbal axis 52. Member 75 has a face 76 of conical form. Spindle 72 carries a driving formation adapted to frictionally engage gimbal surface 76, such engagement taking place, as will be described, by virtue of axial movement of the spindle. That driving formation may, for example, comprise the conical periphery 78 of a wheel 77 rigidly mounted on the spindle, as shown.

In normal uncaged operation of the gyroscope, the axial position of spindle 72 is such that driving surface 78 is spaced above inner gimbal surface 76, as in Fig. 1, leaving both gimbals free to rotate through 360° about their respective gimbal axes. To initiate caging action, spindle 72 is advanced, as by means to be described, axially downward to bring its driving surface 78 into frictional engagement with inner gimbal surface 76 (Fig. 1A); and is caused to rotate about its axis 73, for example in the direction indicated by the arrow 63. That spindle rotation exerts on inner gimbal 50 a torque about its axis 52 in the typical direction indicated by the arrow 64. That torque is preferably yielding in its nature, as is typically the case with the frictional engagement described. It will be understood without specific illustration that the coefficient of friction between surfaces 76 and 78 may be controlled by suitable selection of the materials of which they are formed, and that the driving connection between those surfaces may be made positive, if desired, as by providing them with conventional gear teeth. The resulting torque, whether yielding or positive in nature, causes inner gimbal 50 to swing about its axis 52 until it reaches a predetermined caging position.

The frictional force exerted on inner gimbal surface 76 is transmitted to the outer gimbal by bearing pivots 53 and 54. Since that force does not pass through outer gimbal axis 32, it necessarily produces a torque about the latter axis, tending to cause the outer gimbal to swing about its axis until it reaches a predetermined caging position.

Figure 1A:
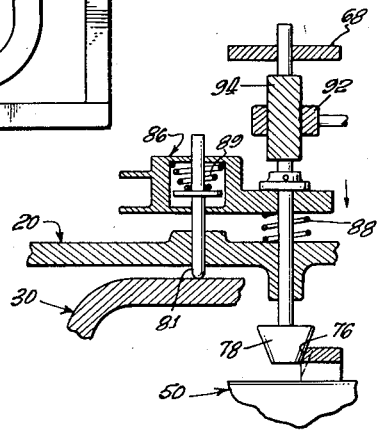
Fig. 1A is a fragmentary section, corresponding to a portion of Fig. 1, but showing the mechanism in gimbal driving position.
Figure 1B:
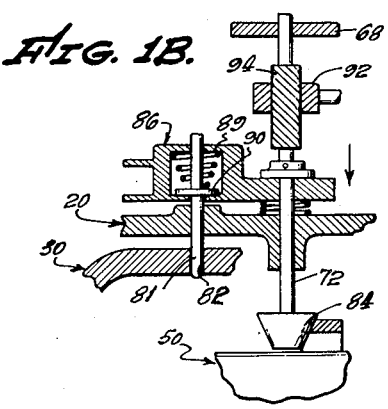
Fig. 1B is a fragmentary section corresponding to Fig. 1A, but showing the mechanism in caged position.

Locking means of any suitable type are provided, capable of locking the respective gimbals in caging position, once that position has been reached. Although many types of releasable locking means are known, it is preferred to utilize as a latch for the inner gimbal a suitable formation carried directly by spindle 72 and made effective by axial advancement of the spindle beyond its described driving engagement with the inner gimbal (Fig. 1A). As shown, a tapered recess 84 is provided in inner gimbal surface 76 in position to receive spindle driving surface 78 when the inner gimbal is in caging position, producing locking engagement of the spindle and inner gimbal (Fig. 1B).

As illustrated, the locking means for outer gimbal 30 comprises a locking pin 80 that is axially movable in a guide hole 81 in top plate 25 of housing 20; means for yieldingly urging the pin downwardly in response to downward movement of caging spindle 72; and a cooperating locking recess 82 (Fig. 1B) in the outer gimbal adapted to receive the pin. An arm 86 is mounted on spindle 72 for free relative rotation in either direction, but in effectively fixed axial relation. As shown, the collar 87 is fixed on the spindle and acts as a positive upper stop for arm 86. A similar lower stop may be provided, but that function may be performed alternatively by the coil spring 88, which acts between arm 86 and frame plate 25. Spring 88 holds arm 86 effectively against collar 87 and yieldingly urges the arm and also the entire caging spindle upwardly with respect to the frame. Pin 81 is received in a vertical bore in arm 86, the coil spring 89 urging the pin yieldingly downward with respect to the arm. Pin flange 90 acts as seat for the spring and also positively limits the downward movement of the pin. The angular position of arm 86 about spindle 72 is defined by guiding action of pin 80 in bore 81 of the frame.

In caging operation, the downward axial movement of spindle 72, already mentioned as completing friction drive 78, 76 to the gimbals, also moves arm 86 positively downward. Pin 80 is thereby moved downward until its lower end strikes the surface of outer gimbal 30, against which it is then lightly pressed by the force of spring 89 (Fig. 1A). That condition continues as outer gimbal 30 is driven about its axis by rotation of spindle 72 to its caging position, when recess 82 is aligned with the pin. Spring 89 then advances the pin end into the recess, locking the outer gimbal in caging position.

To uncage the gyroscope, the two sets of locking formations, by which the respective gimbals are locked in caging position, are released in any suitable manner, and the spindle driving formation 78 is withdrawn from ring 75. An advantage of the described type of locking formations is that withdrawal of the spindle from ring 75 automatically disengages spindle surface 78 from locking recess 84 of the inner gimbal and lifts arm 86, withdrawing pin 80 from recess 82 of the outer gimbal. Accordingly, with the described type of locking means, the gyroscope can be completely uncaged by the very simple operation of withdrawing spindle 72 upward to the position of Fig. 1. That uncaging movement of the spindle may involve axial movement only; but an advantage of the described type of locking formations is that rotation of the spindle may take place either during caged condition of the gyroscope or during the uncaging operation without interfering with the locking or releasing action.

The described movements of spindle 72 may be produced and controlled in any suitable manner. A preferred type of mechanism for producing and controlling such movements is shown illustratively in Fig. 1. A driving shaft 90 carries a helical gear 92, which is continuously meshed with a helical gear 94 fixed on the spindle. Driving shaft 90 is shown in transverse relation to spindle 72, but it may, for example, comprise a sleeve coaxially surrounding the spindle and linked to it by helical structure such as a helical spline. The term helical gear is used herein in the sense of including such equivalent structures. Driving shaft 90 is preferably driven by a reversible electric motor, indicated at 95, acting through a suitable speed reduction gear, shown schematically at 96.

An advantage of employing helical gears for driving the caging spindle is that they provide a desirable dual action of inducing both rotary movement and axial movement, the ratio of those movements being variable in accordance with the respective resistances that they encounter. The hand of the helical gears is so selected that rotary driving of the spindle in the direction employed for caging operation, typically shown by arrow 63, is accompanied by a yielding axial force on the spindle in a direction to advance the described gimbal driving and locking formations into engagement with the cooperating formations on the gimbals.

Any suitable means may be provided for controlling motor 95. For example, motor 95 may be a direct current motor receiving power from a source of direct current power, indicated as the battery 100 via a double pole, double throw reversing switch, indicated at 102. Limit switch means of any suitable type are preferably included in the control circuit, such means being shown illustratively as the double throw switch 103, having an armature 104 and contacts 105 and 106. Armature 104 is of the type that provides snap action, so that opening of one contact immediately causes closing to the other contact. Switch actuating lugs 108 and 109 are provided on spindle-controlled arm 86, and are so arranged that presence of the spindle in uncaged position causes switch closure to contact 105; and caged spindle position opens that contact and causes switch closure to contact 106.

Closure of control switch 102 downward in Fig. 1 supplies voltage via lines 97 and 98 to motor 95 with a polarity that drives the motor in a forward direction, corresponding to spindle rotation in the direction of arrow 63. When the spindle reaches the position of Fig. 1B, that driving circuit is opened at contact 105, and closure of contact 106 prepares a circuit for reverse operation of motor 95 upon manual closure of control switch 102 upward. With the mechanism initially in the position of Fig. 1, starting of motor 95 in the forward direction quickly accelerates driving gear 92 to operating speed. The moment of inertia of spindle 72 about its axis tends to resist its rotary acceleration, and that resistance initially causes the helical gears to exert a downward axial thrust upon the spindle. That thrust is sufficient to overcome the relatively light force of spring 88, which merely supports the weight of the spindle and arm 86 when in uncaged position. The spindle is thus rapidly advanced axially downward, engaging its driving surface 78 with the surface of revolution 76 on the inner gimbal. At the same time locking pin 80 is advanced into yielding engagement with the outer gimbal (Fig. 1A).

As soon as spindle driving surface 78 engages the gimbal surface, the friction at that surface resists spindle rotation, causing continuation of the action already described by which the helical gears urge the spindle axially downward. That downward thrust, in turn, increases the friction. By suitable design of the parts, a highly effective driving connection is established between the spindle and gimbal surface 76, tending to drive both gimbals to their respective caging positions. When those positions are reached, each gimbal is locked by the locking means already described. Due to the yielding connection provided by spring 89 between the spindle and outer gimbal locking pin 80, it is immaterial which gimbal reaches caging position first.

To uncage the gyroscope, it is only necessary to start motor 95 in the reverse direction. The inertial resistance of spindle 72 to angular acceleration causes helical gears 92, 94 to produce an upward axial thrust upon the spindle, which rapidly shifts the latter to the position of Fig. 1, releasing both gimbals effectively simultaneously.

Figure 2:
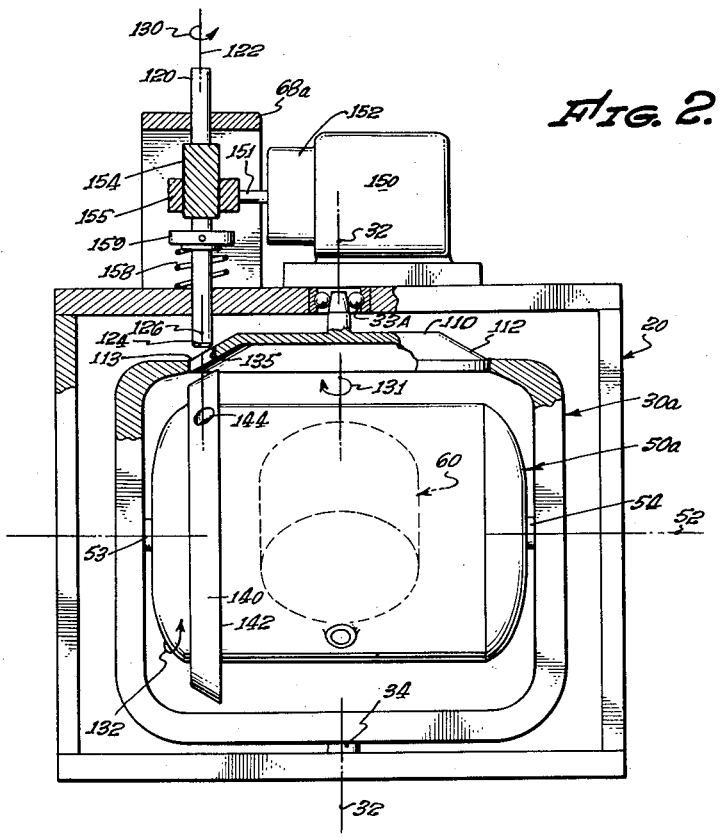
Fig. 2 is a partly schematic side elevation, partly cut away, representing another illustrative embodiment of the invention in uncaged position.

A further illustrative embodiment of the invention is represented somewhat schematically in Fig. 2. Outer gimbal 30a comprises a generally rectangular frame, journaled with respect to housing 20 by the bearings 33a and 34 on outer gimbal axis 32. The upper portion of gimbal frame 30a consists typically of a circular member 110 having an oblique edge portion 112. The upper face 113 of that edge portion forms a surface of revolution with respect to outer gimbal axis 32, that surface being conical as shown. A caging spindle is represented at 120, slidingly journaled in housing 20 and in fixed bracket 68a on a vertical spindle axis 122. That axis is offset with respect to outer gimbal axis 32, and is typically shown parallel to that axis, although that relation is not necessary. The lower end of spindle 120 carries gimbal driving and locking surfaces 124 and 126, which are surfaces of revolution with respect to spindle axis 122 and are preferably respectively conical and substantially cylindrical in form. As illustratively shown, driving and locking surfaces 124 and 126 are formed directly on the body of the spindle. Spindle 120 is so positioned with respect to the outer gimbal that driving surface 124 is engageable with the oblique upper face 113 of gimbal frame member 110. That engagement is produced by downward axial advance of the spindle from its normal uncaged position (Fig. 1), and may be released by reverse axial movement. During such engagement, spindle rotation in a forward direction, typically indicated by the arrow 130, exerts a torque upon outer gimbal 30a tending to turn it about its axis 32 in the direction indicated by the arrow 131.

Figure 2A:
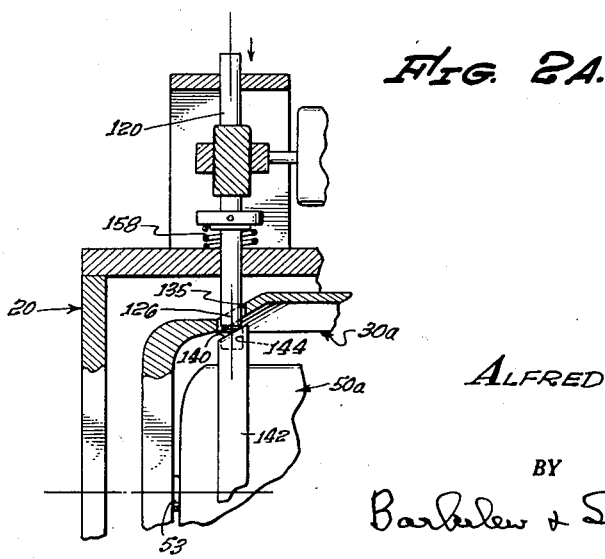
Fig. 2A is a fragmentary section corresponding to a portion of Fig. 2 and showing the mechanism in partially caged position.

A recess 135 is provided in the surface 113 of the outer gimbal in position to be aligned with spindle 120 when the outer gimbal is in a definite predetermined caging position. Recess 135 comprises a through bore in frame member 110, preferably providing a good sliding fit with spindle locking surface 126. When the outer gimbal has been driven to caging position, the lower end of the spindle may thus be axially advanced into fitting engagement with recess 135, effectively locking the outer gimbal in caging position; and further axial advance then projects the spindle end through the bore 135 into the space within outer gimbal 30a (Fig. 2A).

Inner gimbal 50a, which is journaled on axis 52 on outer gimbal 30a by the bearings 53 and 54, is provided with a surface 140, which is a surface of revolution with respect to axis 52. That surface is so located that it lies closely below the oblique portion 112 of outer gimbal frame member 110 and is engageable by the spindle when the latter projects through locking recess 135. As shown, surface 140 is typically formed on an annular caging member 142, rigidly mounted on the inner gimbal coaxially with its axis 52. When spindle 120 is axially advanced through outer gimbal recess 135, as already described, its driving surface 124 frictionally engages inner gimbal surface 140. Spindle rotation in the forward direction (arrow 130) then exerts a torque upon the inner gimbal tending to rotate it in the direction indicated by the arrow 132. A locking recess 144 is provided in inner gimbal surface 140 in position to receive the spindle end when the inner gimbal (and also the outer gimbal) is in caging position, thereby locking the gimbal in that position in the manner already described in connection with the previous embodiment.

In the present embodiment, as in that of Fig. 1, it is preferred to produce the required rotational and axial movements of the caging spindle by means of a reversible motor, driving the spindle through a linkage of helical type. Such a drive is shown illustratively in Fig. 2, in form closely similar to that of Fig. 1. A reversible motor is indicated at 150, driving shaft 151 through speed reducing gear 152. Intermeshing helical gears 154 and 155 are rigidly mounted on spindle 120 and on driving shaft 151, respectively. Further control means for the spindle may be provided as may be required, such, for example, as the coil spring 158, which acts between housing 20 and the collar 159 fixed on the spindle and which exerts an upward axial force on the spindle sufficient to substantially balance its weight.

Caging of both gimbals is then produced directly by forward rotation of motor 150, which drives spindle 120 in forward rotation (arrow 130) and at the same time yieldingly urges axial advance of the spindle downward into successive frictional engagement with the two gimbals. Outer gimbal surface 113 is engaged first, checking the axial advance of the spindle and frictionally driving the outer gimbal to caging position by virtue of continuing spindle rotation. With the outer gimbal in caging position, spindle 120 is axially advanced, by the continuing thrust of the helical gears, into locking engagement with outer gimbal recess 135, and also into driving relation with inner gimbal surface 142. Continuing spindle rotation then frictionally drives the inner gimbal to caging position, where it is locked by axial insertion of the spindle end into recess 144. Caging is thereby completed, and motor 150 can be stopped, either manually or by any suitable type of automatic control.

Uncaging operation requires only reverse operation of motor 150, the resulting upward axial thrust on the spindle withdrawing it rapidly both from inner gimbal recess 144 and from outer gimbal recess 135. Both gimbals are thereby released substantially simultaneously, putting the gyroscope in condition for normal operation.

The specific embodiments of the invention that have been shown and described are intended only as illustration, and it will be understood by those skilled in the art that many changes may be made in those embodiments without departing from the proper scope of the invention, which is defined in the appended claims.

I claim:

1. In combination with a gyroscope of the type that includes a frame, a gimbal rotatable with respect to the frame about a gimbal axis, and a rotor carried by the gimbal; caging means for the gimbal, comprising a member journaled on the frame for rotary and axial movements with respect to a member axis, structure on the member and on the gimbal forming respective surfaces interengageable by virtue of axial movement of the member and acting when engaged to drive the gimbal about the gimbal axis by virtue of member rotation, means acting in response to a predetermined rotary position of the gimbal to lock the gimbal in that position, and control means for driving the member in its rotary and axial movements, said control means comprising a driving shaft, intermeshing helical gear means forming a driving connection between the driving shaft and the member, and means actuable to cause rapid acceleration of the driving shaft and thereby to cause simultaneous rotary and axial acceleration of the member into gimbal driving relation.

2. In combinaiton with a gyroscope of the type that includes a frame, a gimbal rotatable with respect to the frame about a gimbal axis, and a rotor carried by the gimbal; caging means for the gimbal, comprising a member journaled on the frame for rotary and axial movements with respect to a member axis, structure on the member and on the gimbal forming respective surfaces interengageable by virtue of axial movement of the member and acting when engaged to drive the gimbal about the gimbal axis by virtue of member rotation, means acting in response to a predetermined rotary position of the gimbal to lock the gimbal in that position, and control means for driving the member in its rotary and axial movements, said control means comprising a driving shaft, intermeshing helical gear means forming a driving connection between the driving shaft and the member, and reversible power means for the driving shaft, said power means being actuable in one direction to engage the said surfaces and to drive the gimbal, and being actuable in the other direction to disengage the said surfaces.

3. In combination with a gyroscope of the type that includes a frame, a gimbal rotatable with respect to the frame about a gimbal axis, and a rotor carried by the gimbal; caging means for releasably locking the gimbal in a predetermined caging position with respect to the frame, and comprising a member journaled on the frame for rotary and axial movement with respect to a member axis, respective driving formations on the member and on the gimbal interengageable by virtue of axial movement of the member only when the gimbal is out of caging position, and acting when engaged and by virtue of member rotation to frictionally drive the gimbal to caging position, respective locking formations on the member and on the gimbal interengageable by virtue of axial movement of the member only when the gimbal is in caging position and acting when engaged to lock the gimbal in that position, and control means for driving the member in its rotary axial movements, said control means comprising a driving shaft, intermeshing helical gear means forming a driving connection between the driving shaft and the member, and power means for the driving shaft actuable selectively in a forward direction to successively engage the said driving formations, drive the gimbal to caging position, and engage the locking formations all by virtue of continuing rotation of the driving shaft in said forward direction.

4. Caging means as defined in claim 3, said power means being selectively actuable in the reverse direction to release said locking formations.

5. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising structure on the respective gimbals forming surfaces of revolution with respect to the respective gimbal axes, a member journaled on the frame for rotary and axial movement with respect to a member axis, a driving formation mounted coaxially on the member, a driving shaft, intermeshing helical gear means forming a driving connection between the driving shaft and the member, and control means actuable to drive the driving shaft in one direction to cause the driving formation to successively engage the respective surfaces of revolution and drive the associated gimbals to their respective caging positions.

6. In a gyroscope caging mechanism of the type that includes a frame, a member journaled on the frame for rotary and axial movements, the member being movable axially in one direction to frictionally engage the gyroscope and in the other direction to disengage the gyroscope, and being movable in forward rotation to drive the gyroscope to caging position; driving means for the member, comprising means normally maintaining the member in axial position to disengage the gyroscope, a driving shaft, intermeshing helical gears on the member and on the shaft, and control means for selectively driving the shaft in a forward direction, forward shaft rotation producing forward rotation of the member and producing movement of the member axially in said one direction to engage the gyroscope.

7. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising a member journaled on the frame for rotary and axial movements with respect to a member axis, said member axis coinciding with the outer gimbal axis, structure on the inner gimbal forming a surface of revolution with respect to the inner gimbal axis, and a driving formation on the member engageable with said surface of revolution by virtue of axial movement of the member.

8. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising a member journaled on the frame for rotary and axial movements with respect to a member axis, said member axis coinciding with the outer gimbal axis, structure on the inner gimbal forming a surface of revolution with respect to the inner gimbal axis, and a driving formation on the member engageable with said surface of revolution, and acting when so engaged to drive both gimbals simultaneously about their respective gimbal axes by virtue of member rotation.

9. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising a member journaled on the frame for rotary and axial movements with respect to a member axis, said member axis coinciding with the outer gimbal axis, structure on the inner gimbal forming a surface of revolution with respect to the inner gimbal axis, and a driving formation on the member engageable with said surface of revolution, and acting when so engaged to drive both gimbals simultaneously about their respective gimbal axes by virtue of member rotation, and means acting in response to caging position of each gimbal to releasably lock the gimbal in that position.

10. In combination with a gyroscope of the type that includes a support frame, an outer gimbal frame journaled on the support frame on a pair of outer gimbal bearings, an inner gimbal journaled on the outer gimbal frame on an inner gimbal axis, and a rotor carried by the inner gimbal; caging means for the gimbals, comprising a caging spindle extending axially through one of the outer gimbal bearings and rotatable about the axis thereof, means carried by the spindle inside the outer gimbal frame and adapted to engage the inner gimbal, and driving means carried by the spindle outside of the outer gimbal frame and adapted to drive the spindle in rotation.

11. In combination with a gyroscope of the type that includes a support frame, an outer gimbal frame journaled on the support frame on a pair of outer gimbal bearings, an inner gimbal journaled on the outer gimbal frame on an inner gimbal axis, and a rotor carried by the inner gimbal; caging means for the gimbals, comprising a caging spindle mounted on the support frame for rotational and axial movements with respect to the axis of the outer gimbal bearings, a portion of the spindle being axially extensible through the center of one of the outer gimbal bearings, structure on the inner gimbal forming a surface of revolution with respect to the inner gimbal axis, a formation carried by the said portion of the spindle and engageable with the surface of revolution on the inner gimbal by virtue of axial movement of the spindle, a driving shaft, helical gear means forming a driving connection between the driving shaft and the spindle, and control means actuable to drive the driving shaft in a forward direction and thereby to cause engagement of the said surfaces and to exert simultaneous torques upon the outer gimbal frame and the inner gimbal, respectively, tending to drive them to predetermined caging positions.

References Cited in the file of this patent

UNITED STATES PATENTS

| | | |
|---|---|---|
| 1,860,230 | Brown | May 24, 1932 |
| 2,200,976 | Bates | May 14, 1940 |
| 2,369,845 | Noxon | Feb. 20, 1945 |
| 2,383,663 | MacCallum et al. | Aug. 28, 1945 |
| 2,422,120 | Noble | June 10, 1947 |